United States Patent [19]

Asada et al.

[11] Patent Number: 4,738,880

[45] Date of Patent: Apr. 19, 1988

[54] AROMATIC POLYESTER FILM HAVING SILICONE RESIN LAYER AND LIQUID CRYSTAL DISPLAY PANEL MADE THEREOF

[75] Inventors: Masahiro Asada; Junji Takase, both of Kobe, Japan

[73] Assignee: Kanegafuchi Kagaku Kogyo Kabushiki Kaisha, Osaka, Japan

[21] Appl. No.: 840,174

[22] Filed: Mar. 17, 1986

[30] Foreign Application Priority Data

Mar. 18, 1985 [JP] Japan ................................. 60-53991

[51] Int. Cl.⁴ ............................................. C09K 19/00
[52] U.S. Cl. ........................................ 428/1; 428/215; 428/447; 428/480
[58] Field of Search ................. 428/1, 215, 447, 480

[56] References Cited

U.S. PATENT DOCUMENTS

| | | | |
|---|---|---|---|
| 4,384,016 | 5/1983 | Ide et al. | 428/1 |
| 4,456,638 | 6/1984 | Petcvich | 428/1 |
| 4,470,668 | 9/1984 | Inoue et al. | 350/343 |

FOREIGN PATENT DOCUMENTS 0112134  6/1984  European Pat. Off. .

*Primary Examiner*—Marion C. McCamish
*Attorney, Agent, or Firm*—Armstrong, Nikaido, Marmelstein & Kubovcik

[57] ABSTRACT

A multilayer film comprising an aromatic polyester layer and a silicone resin layer formed on at least one surface of the aromatic polyester layer. The multilayer film has excellent transparency, heat resistance, dimensional stability, mechanical strength and optical property and an improved solvent resistance, and is useful as a material of a liquid crystal display panel.

9 Claims, No Drawings

AROMATIC POLYESTER FILM HAVING SILICONE RESIN LAYER AND LIQUID CRYSTAL DISPLAY PANEL MADE THEREOF

BACKGROUND OF THE INVENTION

The present invention relates to a multilayer film comprising a layer of an aromatic polyester and a layer of a silicone resin, which is useful as a panel material for a liquid crystal display device. More particularly, the invention relates to a multilayer film comprising a layer of an aromatic polyester prepared from a bivalent phenolic compound or its derivative and an aromatic dicarboxylic acid or its derivative and a layer of an organopolysiloxane, and a liquid crystal display device part using the multilayer film.

In recent years, there is lively studied about using a polymer film provided with a transparent conductive layer on its surface as a liquid crystal display panel in place of a conventional display panel using a glass substrate, in compliance with request of a lighter, larger and breakage-resistant display panel.

Representative polymer films usable for this purpose are polyimide and polyethylene terephthalate films. However, the polyimide film has the drawbacks that the transparency is poor and the moisture absorption is high and, therefore, is not suitable for this purpose, though it has excellent heat resistance and dimensional stability. A biaxially stretched polyethylene terephthalate film has excellent properties such as transparency, mechanical property at ordinary temperature and dimensional stability. However, the index of birefringence is large and, therefore, it is not suitable particularly for display which utilizes polarization phenomenon and requires an optical isotropy, e.g. TN (twisted-nematic) mode liquid crystal display. For this purpose, it is studied to use a uniaxially stretched polyethylene terephthalate film, but the film has an optical anisotropy and its optical axis must be strictly accorded with the optical axis of a polarizer used for a liquid crystal display device. Therefore, the workability and yield are very low.

It has been attempted to use transparent films of thermoplastic amorphous polymers called heat resistant engineering plastics as a panel material for liquid crystal display. Representative one is a polyether sulfone (PES) film. The PES film is inferior in organic solvent resistance and moisture permeability, and when used in liquid crystal display, a good transparent conductive layer is hard to be formed and also the resistance to liquid crystal materials is poor.

It is a primary object of the present invention to provide a material suitable for a liquid crystal display panel.

The above and other objects of the present invention will become apparent from the description hereinafter.

SUMMARY OF THE INVENTION

It has now been found that an aromatic polyester (polyarylate) film or sheet provided with a silicone resin film on at least one surface thereof is very useful as a base material for a liquid crystal display panel.

In accordance with the present invention, there is provided a multilayer film comprising a layer of an aromatic polyester and a layer of a silicone resin.

The present invention also provides a transparent conductive film useful as a liquid crystal display panel comprising the above-mentioned multilayer film.

DETAILED DESCRIPTION

In the present invention, there are used aromatic polyesters comprising recurring units of the formula (I):

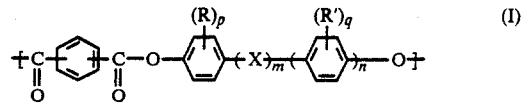

wherein X is a bivalent group selected from the group consisting of an unsubstituted or substituted bivalent hydrocarbon group having 1 to 10 carbon atoms, —O—, —S—, —SO$_2$— and —CO—, R and R' are a monovalent group selected from the group consisting of alkyl, aryl, aralkyl, alkoxyl, aryloxyl and arylalkoxyl groups having 1 to 20 carbon atoms, their substituted groups, a halogen atom, and a mixture thereof, p and q are 0 or an integer satisfying the equation: p+q=0 to 8, and m and n are 0 or 1, but n is not 0 when m is 1. Preferable aromatic polyesters are those having substituents at the 3 and 5 positions of the dihydric phenol component, wherein a part or all, especially at least 5% by mole, of the recurring units (I) are units of the formula (II):

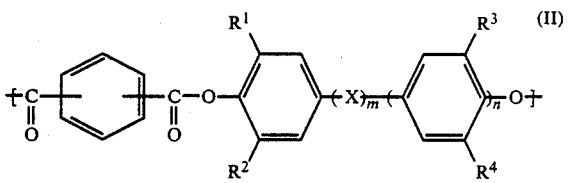

wherein X, m and n are as defined above, and $R^1$, $R^2$, $R^3$ and $R^4$ are a monovalent group selected from the group consisting of an alkyl group having 1 to 4 carbon atoms, an alkoxyl group having 1 to 4 carbon atoms, phenyl group and a halogen atom. More preferably, the aromatic polyesters have a glass transition temperature of not less than 150° C. The recurring unit (II) is effective for raising the glass transition temperature of the aromatic polyester and improving the moisture resistance. In particular, the recurring unit (II) wherein $R^1$ to $R^4$ are methyl group is useful, because of being easily obtainable.

The aromatic polyesters can be prepared by known methods from an aromatic dicarboxylic acid and a dihydric phenol compound which may be a dihydric mononuclear phenol, a dihydric polynuclear phenol or a mixture thereof. Terephthalic acid, isophthalic acid or a mixture thereof is used as the aromatic dicarboxylic acid in the present invention.

Preferable examples of the dihydric phenol compound used in the present invention are 2,2-bis(3,5-dimethyl-4-hydroxyphenyl)propane, 2,2-bis(3,5-di-sec-butyl-4-hydroxyphenyl)propane, 2,2-bis(3,5-di-tert-butyl-4-hydroxyphenyl)propane, bis(3,5-dimethyl-4-hydroxyphenyl)methane, 1,1-bis(3,5-dimethyl-4-hydroxyphenyl)ethane, 1,1-bis(3,5-dimethyl-4-hydroxyphenyl)cyclohexane, bis(3,5-dimethyl-4-hydroxyphenyl)ketone, bis(3,5-dimethyl-4-hydroxyphenyl)ether, bis(3,5-dimethyl-4-hydroxyphenyl)sulfide, 2,2-bis(3,5-dimethyl-4-hydroxyphenyl)hexafluoropropane, 2,2-bis(3,5-dimethoxy-4-hydroxyphenyl)propane, bis(3,5-dimethoxy-4-hydroxyphenyl)methane, 2,2-bis(3- methoxy-4-hydroxy-5-methylphenyl)propane, bis(3-methoxy-4-hydroxy-5-methylphenyl)methane, bis(3,5-diphenyl-4-hydroxyphenyl)methane, 2,2-bis(3,5-diphenoxy-4-hydroxyphenyl)propane, bis(3-phenoxy-4-hydroxy-5-methyl)methane, 4,4'-dihydroxy-3,3',5,5'-tetramethylbiphenyl, 4,4'-dihydroxy-3,3',5,5'tetramethylbiphenyl, bis(4-hydroxy-3-methylphenyl)sulfone, bis(4-hydroxy-3,5-dimethylphenyl)sulfone, bis(4-hydroxy-3-ethylphenyl)sulfone, bis(4-hydroxy-3,5-dimethoxyphenyl)sulfone, bis(4-hydroxy-3,5-diethoxyphenyl)sulfone, and the like.

These preferable dihydric phenol compounds having substituents at the 3 and 5 positions can be used alone or in combination with other dihydric phenol compounds such as 4,4'-dihydroxybiphenyl, bis(4-hydroxyphenyl)methane, 1,1-bis(4-hydroxyphenyl)ethane, 2,2-bis(4-hydroxyphenyl)propane, hydroquinone and resorcinol. Also, bisphenol coloring matters may be used, e.g. phenolphthalein, fluorescein, naphtholphthalein and thymolphthalein.

Preferably, the aromatic polyesters having a glass transition temperature of not less than 150° C. are used in the present invention. In the application to liquid crystal display, an electrically conductive polymer film having a good transparency is obtained from such polyesters without causing deformation of film upon providing a transparent conductive metal layer having a good adhesion on the film.

A transparent film can be prepared from the aromatic polyester by a usual method such as extrusion or casting.

Organopolysiloxanes used in the present invention to form a silicone resin layer on the surface of the aromatic polyester film are polymers prepared from an organosilane having 2 to 3 functional groups, a silicate having 4 functional groups, and/or their condensate oligomer. The functional groups include, for instance, an alkoxyl group, epoxy group, vinyl group, acryloyloxy group, amino group, mercapto group, and a mixture thereof. The organosilane and silicate compounds may be employed in combination with a curing catalyst. Examples of the silane and silicate compounds are, for instance, dimethoxydimethylsilane, trimethoxymethylsilane, phenyltriethoxysilane, tetraethyl silicate, trimethoxyglycidyloxypropylsilane, β-(3,4-epoxycyclohexyl)ethyltrimethoxysilane, γ-methacryloyloxypropyltrimethoxysilane, trimethoxyglycidylsilane, tris(methoxyethoxy)vinylsilane, γ-mercaptopropyltrialkoxysilane, β-aminoethyliminopropylmethylsilane, and the like. Partial hydrolysis products of these compounds can of course be used.

These monomers and/or condensate oligomers may be used, as occasion demands, in the form of a solution in an alcohol such as isopropanol or an ethylene glycol alkyl ether such as butyl β-hydroxyethyl ether. A finely divided silica such as colloidal silica may be dispersed in the solution.

The film of a silicone resin is formed on at least one surface of the polyester film by applying the monomer and/or condensate which may be in the form of a solution in an organic solvent, to the aromatic polyester film and curing it by means of heating, ultraviolet ray, or the like. The silicone resin film remarkably improves the organic solvent resistance of the aromatic polyester base film without imparing the transparency. This feature is important in applying the multilayer film of the invention to the liquid crystal display purpose in points of preventing deterioration of film caused by interaction between liquid crystal compounds and the film.

When the thickness of the aromatic polyester base film is from 0.001 to 5 mm, preferably 0.01 to 1 mm and the thickness of the silicone resin layer is from 0.0001 to 0.050 mm, preferably 0.001 to 0.030 mm, the multilayer film of the invention maintains a transparency such that the visible ray transmission is not less than 70% and the degree of birefringence is not more than 30 nm, and shows a sufficient solvent resistance.

A transparent conductive film can be formed on the silicone resin layer of the multilayer film by usual known methods such as vaccum evaporation, sputtering, ion plating and coating of a solution of an organometallic compound. A metal oxide is usually used for the transparent conductive film, e.g. oxides of transition metals and metals of Groups III-B and IV-B of the Periodic Table such as titanium, zirconium, chromium, tungsten, nickel, silicon, germanium, tin and lead. The metal oxide may be used alone or in admixture thereof. Representative example of the mixture of metal oxides is indium-tin-oxide (ITO). The multilayer film provided with the transparent conductive layer is useful for use in liquid crystal display device as a transparent conductive film having an extremely small optical anisotropy.

The present invention is more specifically described and explained by means of the following Example. It is to be understood that the present invention is not limited to the Examples, and various changes and modifications may be made in the invention without departing from the spirit and scope thereof.

EXAMPLE 1

A 15% by weight solution of a polyarylate was prepared by dissolving a polyarylate of terephthalic acid-/isophthalic acid (9/1 mole) and bisphenol A/3,3',5,5'-tetramethyl-bisphenol F (2/1 mole) in 1,1,2,2-tetrachloroethane. The solution was cast on a glass plate and was heated on a hot plate stepwise at 50° C. for 20 minutes, at 100° C. for 20 minutes and at 150° C. for 20 minutes, thereby removing the solvent. The formed polyarylate film was peeled off from the glass plate, fixed at the four sides by a clamp and heat-set at 250° C. for 10 minutes to give a film having a thickness of about 100 μm.

The polyarylate film was then pre-treated by washing the surface with isopropanol. A silicone primer (grade No. PH 91 made by Toshiba Silicone Kabushiki Kaisha) was applied to the washed surface, and thereto further applied an isopropanol solution containing trifunctional and tetrafunctional alkoxysilanes as main components (commercially available under the trademark "Tosguard 510" made by Toshiba Silicone Kabushiki Kaisha). After air-drying for 30 minutes to evaporate the solvent, it was cured by heating at 120° C. for 1 hour to form a film.

The thus obtained two-layer film was immersed in toluene, and the damage thereof was observed.

The results of the immersion test and measurement of physical properties are shown in Table 1 together with the results for the polyarylate film having no silicone resin layer.

TABLE 1

|  | multilayer film | Non-treated film |
|---|---|---|
| Tensile strength (kg/cm$^2$) | 800 | 810 |
| Elongation (%) | 30 | 28 |

TABLE 1-continued

| | multilayer film | Non-treated film |
|---|---|---|
| Glass transition temp.*(°C.) | 215 | 215 |
| Light transmission (%) | 90 | 90 |
| Haze | 0.5 | 0.5 |
| Birefringence (nm) | 12 | 12 |
| Immersion in toluene at room temp. | | |
| 7 days | no change | swelling |
| 14 days | " | " |
| 28 days | " | " |

*measured by a TMA method

As shown in Table 1, the surface-treated polyarylate film, namely the mutilayer film of the invention, has a remarkably improved solvent resistance as compared with the non-surface-treated polyarylate film.

In addition to the ingredients used in the Example, other ingredients can be used in the Example as set forth in the specification to obtain substantially the same results.

What we claim is:

1. A multilayer film comprising a layer of an aromatic polyester and a layer of silicone resin wherein said aromatic polyester comprises recurring units of the formula (I):

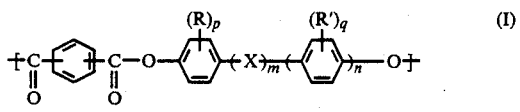

wherein X is a bivalent group selected from the group consisting of a bivalent hydrocarbon group having 1 to 10 carbon atoms, —O—, —S—, —SO$_2$— and —CO—, R and R' are a monovalent group selected from the group consisting of alkyl, aryl, aralkyl, alkoxyl, aryloxyl and arylalkoxyl groups having 1 to 20 carbon atoms, their substituted groups, a halogen atom, and a mixture thereof, p and q are 0 or an integer satisfying the equation: p+q=0 to 8, and m and n are 0 or 1, but n is not 0 when m is 1.

2. The multilayer film of claim 1, wherein a part of all of said recurring units (I) is units of the formula (II):

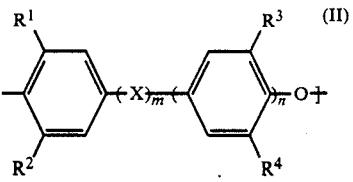

wherein X, m and n are as defined above, and $R^1$, $R^2$, $R^3$ and $R^4$ are a monovalent group selected from the group consisting of an alkyl group having 1 to 4 carbon atoms, an alkoxyl group having 1 to 4 carbon atoms, phenyl group and a halogen atom.

3. The multilayer film of claim 1, wherein said aromatic polyester has a glass transition temperature of not less than 150° C.

4. The multilayer film of claim 1, wherein said silicone resin is an organopolysiloxane.

5. The multilayer film of claim 4, wherein said organopolysiloxane is a polymer prepared from at least one member selected from the group consisting of an organosilane having 2 or 3 functional groups, a tetrafunctional silicate, and their condensate oligomers.

6. The multilayer film of claim 1, wherein the aromatic polyester layer has a thickness of 0.001 to 5 mm and the silicone resin layer has a thickness of 0.0001 to 0.050 mm.

7. The multilayer film of claim 1, having a visible ray transmission of not less than 70% and a double refraction of not more than 30 nm.

8. A liquid crystal display panel comprising a layer of an aromatic polyester, a layer of a silicone resin and a transparent conductive layer formed on the silcone resin layer wherein said aromatic polyester comprises recurring units of the formula (I):

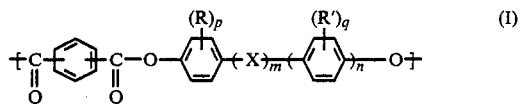

wherein X is a bivalent group selected from the group consisting of a bivalent hydrocarbon group having 1 to 10 carbon atoms, —O—, —S—, —SO$_2$— and —CO—, R and R' are a monovalent group selected from the group consisting of alkyl, aryl, aralkyl, alkoxyl, aryloxyl and arylalkoxyl groups having 1 to 20 carbon atoms, their substituted groups, a halogen atom, and a mixture thereof, p and q are 0 or an integer satisfying the equation: p+q=0 to 8, and m and n are 0 or 1, but n is not 0 when m is 1.

9. The liquid crystal display panel of claim 8, wherein the aromatic polyester layer has a thickness of 0.001 to 5 mm and the silicone resin layer has a thickness of 0.0001 to 0.050 mm.

* * * * *